United States Patent Office 3,395,099
Patented July 30, 1968

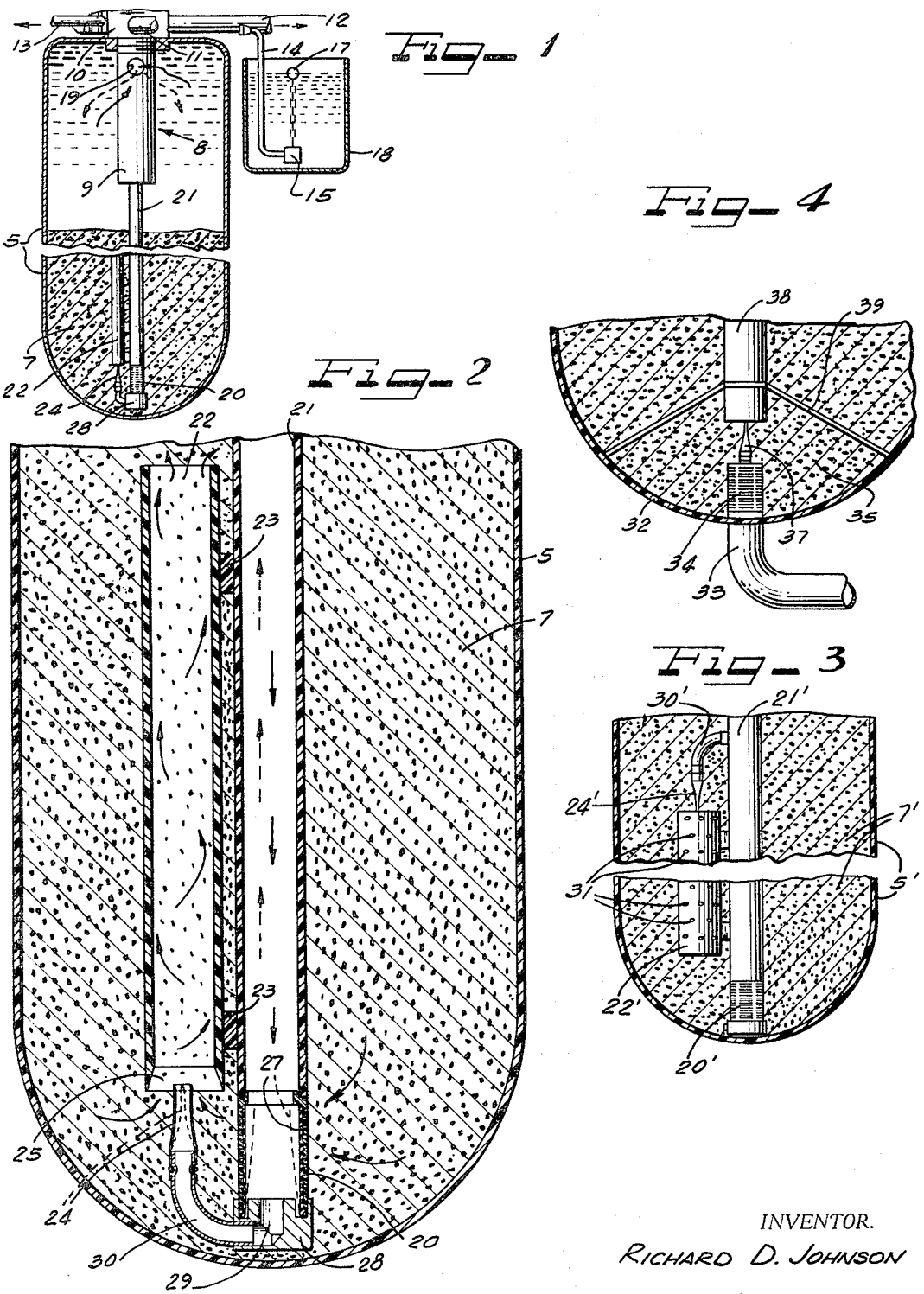
INVENTOR.
RICHARD D. JOHNSON

3,395,099
METHOD AND MEANS FOR BACKWASHING
MINERAL BEDS
Richard D. Johnson, 1467 Wicke Ave.,
Des Plaines, Ill. 60018
Filed June 24, 1965, Ser. No. 466,549
17 Claims. (Cl. 210—35)

This invention relates to improvements in means for backwashing mineral beds and is especially applicable to ion exchange mineral which requires regeneration desirably preceded by backwashing of the mineral bed to cleanse it of foreign matter filtered from the fluid which has passed downwardly through the bed during the service cycle or phase in operation of the apparatus or system. Water-softening apparatus is representative of this class of apparatus and system.

In water softeners, for example, the untreated water entering the softener tank above the mineral bed most generally carries entrained solid particulate material such as iron oxides and other mineral particles in addition to calcium, magnesium, and the like, in solution, which cause the water to be objectionably hard and are primary reasons for treatment of the water. As the water moves downwardly through the mineral bed to the screen at the lower end of the distributor manifold during a service cycle, the particulate material brought into the tank by the raw water is filtered out by the mineral bed. In time, this filtrate of foreign matter seriously interferes with the ion exchange activity of the mineral. Therefore, it has been common practice in water softeners and other ion exchange systems, as well as in respect to discrete particle filter beds generally, to effect periodic backwashing of the bed to dislodge and float off foreign matter or filtrate.

Some foreign materials such, for example, as iron oxide, have a tendency to adhere to the particles of mineral in the bed and, in time, even to effect agglomeration or caking of the mineral particles to the extent that ordinary percolating type of backwashing will not suffice to attain adequate or at least desirable cleaning of the mineral.

An important object of the present invention is to provide new and improved means for efficiently backwashing ion exchange mineral beds, particulate material filtration beds, and the like, which will be referred to generically hereinafter as "mineral beds."

Another object of the invention is to provide new and improved means for backwashing mineral beds in a manner to attain an efficient mineral scrubbing action to dislodge foreign material that may have become attached to or which may tend to adhere to the mineral particles.

A further object of the invention is to provide new and improved backwashing means for mineral beds by which the mineral is circulated in the bed during backwashing.

Still another object of the invention is to provide new and improved backwashing means for mineral beds which will avoid caking or channeling of the bed, and which will reduce the time and the volume of flushing fluid needed to effect backwashing while attaining substantial increase in cleansing action.

Yet another object of the invention is to provide new and improved mineral bed backwashing means which will permit the use of a higher mineral concentration in a given tank space or volume.

A still further object of the invention is to provide new and improved backwashing means of the character described which is simple and efficient in construction, reliable in operation and of low cost, as well as of such versatility that it is readily adaptable for a wide range of preferences in apparatus embodiments.

Other objects, features and advantages of the present invention will be readily apparent from the following detailed description of certain preferred embodiments thereof taken in conjunction with the accompanying drawing in which:

FIGURE 1 is a fragmental vertical sectional elevational view, comprising in part a schematic illustration, of apparatus embodying the invention and more particularly a water-softening system;

FIGURE 2 is a substantially enlarged vertical sectional detail view showing the lower portion of the tank of FIGURE 1 and the backwashing means;

FIGURE 3 is a fragmental vertical sectional elevational view similar to FIGURE 2, but showing a modification; and FIGURE 4 is a fragmentary vertical sectional elevational detail view showing a further modification.

By way of practical example, the invention will be described as applied to water softeners, there being shown in FIGURE 1 a type of water softener especially suitable for domestic use and comprising a vertically disposed tank 5 having therein a mineral bed 7 of any preferred mineral suitable for the purpose. Above the mineral bed a suitable volume of the tank provides liquid storage space into which, in a preferred form, at least a portion of a flow controlling unit 8 extends through the top of the tank.

Only a portion of the flow controlling unit 8 is shown, sufficient to provide environmental background for the present invention. To the extent illustrated, the unit comprises a valve housing body 9 within the tank and depending from a distributor 10 including a raw-water intake 11, a treated water delivery or service passage from which leads a conduit 12, and a drain outlet 13. Also connected to the distributor 10 is a regenerant or brine intake duct 14 leading from a brine level controlling valve structure 15 controlled by a float 17 within a regenerant or brine tank 18. Suitable means, not shown, are provided on or in association with the distributor 10 for manually or automatically operating the system through service, backwashing, regeneration and washing cycles.

During the service cycle, raw water received through the intake 11 passes under valve control through a port 19 opening from the side of the valve housing 9 into the upper portion of the reservoir chamber space adjacent to the top of the tank 5, substantially as indicated by the directional dash arrows. In response to service demand, the raw water filters down through the mineral bed 7 and is drawn through a screen 20, shown as of the slotted type, mounted on the lower end portion of a vertical manifold pipe 21 carried by and communicating with the lower end of the valve housing 9. Thence the treated water is directed through the distributor 10 into the service conduit 12.

Before regenerating the mineral in the bed 7, it is customary to backwash for a suitable time interval to cleanse the bed of foreign material brought into the tank with the raw water. For this purpose, it has heretofore been customary to valve the wash water downwardly through the manifold 21 to issue from the screen 20 serving as a distributor and to percolate upwardly through the mineral bed and thereby float foreign material or filtrate from the mineral to be withdrawn through the port 19, as indicated by solid line flow arrows, and to pass off through the drain 13. As an incident to such percolating backwashing, the mineral particles are lifted and, unless badly caked, loosened, so that the top of the bed rises substantially within the upper reservoir portion of the tank, the height of which is predetermined to have the port 19 above the highest level reached by the top of the mineral bed during the backwashing cycle.

According to the present invention, backwashing is effected in a substantially improved manner which reduces the expansion of the mineral bed upwardly during backwashing so that less headroom is needed within the tank, while at the same time the backwashing cycle is substantially accelerated with improvement in effectiveness. As a result, a larger quantity of mineral may be utilized in a tank heretofore capable of accommodating only a smaller volume of mineral, so that in addition to improved backwashing, improved softening cycle is attained by virtue of the larger volume of mineral. On the other hand, a smaller tank can be used for a given hardness rating of water while employing the same volume of softening mineral as heretofore.

To this end, means are provided comprising a tube 22 serving as a scrubbing stack and located as nearly as practicable centrally at the mineral bed 7, with the lower end of the tube adjacent to, but spaced from, the bottom of the tank and the upper end of the tube opening below the normal settled top of the mineral bed. Conveniently, the scrubbing stack tube 22 is secured as by means of spacer blocks 23 to, and parallel with, the manifold pipe 21, with the lower end of the tube 22 adjacently above and out of blocking range of the screen 20. Thereby, free entry of soft water during service cycle throughout the perimeter of the tubular screen is enabled.

Instead of distributing the wash water from the manifold 21 through the screen 20 to percolate upwardly through the mineral bed 7, means are provided for injecting the wash water into the lower end of the scrubbing stack tube 22 whereby to eject the mineral of the bed 7 into the tube 22 to be carried upwardly at high velocity through the scrubbing stack. For this purpose, a combination injector-ejector nozzle 24 is aligned with the lower end of the scrubbing tube stack and all of the backwashing water is directed in a substantially jet stream upwardly into the stack. At the start of the backwashing cycle, the jet stream agitates and lifts upwardly in the tube 22 any softening mineral that has settled down within the tube as part of the resting mineral bed. As such encompassed mineral moves upwardly toward ejection from the top of the tube, additional mineral is ejected from the mass of mineral in the lower portion of the bed into the scrubbing tube and carried upwardly by the backwashing stream. By reason of the velocity generated in the tube 22 and the normal tendency of a stream propelled through a tube at high velocity to swirl therein, considerable agitation of the mineral particles occurs while passing through the scrubbing tube stack whereby foreign matter is effectively dislodged therefrom. As the column of backwash water and entrained mineral particles eject from the top of the tube 22, the mass of mineral thereabove is caused to boil up with a generally rolling action but with less lifting of the mineral bed than under the conventional percolating backwashing method, because the point of ejection of the column is substantially above the bottom of the mineral bed and the effect of the up-surging wash water is therefore present in only the upper, for example about one-third, portion of the mineral bed, while as much mineral as is carried up through the backwashing stack is being ejection pumped from the lower part of the mineral bed into the stack by the backwashing jet stream. Since the bulk of, and at least, the larger particles of foreign matter comprise filtrate in the upper portion of the mineral bed, it will be apparent that by agitation of the upper portion of the bed such filtrate is washed off together with the foreign matter that has been washed from the mineral in its passage through the washing or scrubbing stack. As the backwashed mineral leaves the top of the scrubbing stack tube 22, it quickly decelerates by gravity and by collision with the superposed mineral particles and drifts back downwardly in the gradually descending mineral bed as the backwashing cycle progresses. Since the foreign material is lighter than the mineral, it continues upwardly into the mineral-free reservoir portion within the tank and escapes, as indicated by solid line directional arrows, through the valve housing port 19 and is carried off with the backwash water through the drain outlet 13.

To facilitate entry of mineral into the lower end of the scrubbing tube 22, the inside wall of the lower end portion of the tube is preferably flared to provide, in effect, a venturi inlet 25. By having the tip of the injector nozzle 24 close to the lower end of the venturi inlet 25, an efficient flow-accelerating effect on the injected backwashing stream is attained.

In order to enable use of the manifold 21 not only for tapping the soft water during the service cycle, represented by dash line flow arrows in FIGURE 2, but also to provide backwash water supply for the nozzle 24 during the backwashing cycle, represented by the full line flow arrows in FIGURE 2, an automatic pressure sensitive valving arrangement is provided for controlling both the screen 20 and the nozzle 24. To this end, a resiliently flexible sleeve valve 27, substantially equal in outside diameter to the inside diameter of the screen 20, is mounted in normally closing relation to the distributor screen. This valve may be made from a fairly thin self-sustaining rubber-like material anchored at its lower end to the lower end of the screen. Upon service demand for soft water, and during the regeneration cycle, suction through the manifold 21 is sufficient to effect inward flexing collapse of the sleeve valve 27 responsive to the inward pressure of water entering through the screen into the manifold. During quiet, non-demand, suction-free periods, the inherent resilience of the sleeve valve 27 causes it to at least tend to return to its screen-closing position. When the direction of flow in the manifold 21 is reversed, that is, caused to flow toward the screen 20 during the backwashing cycle, the sleeve valve 27 effectively closes the screen against at least any substantial outward flow of water therefrom.

From the closed screen 20, backwash water is conveyed through an adapter 28 providing an end closure for the screen. This adapter has an angular fluid passage 29 entering from the inner end of the adapter and communicating laterally with a nozzle tube 30 extending outwardly and upwardly and having attached to its discharge end the lower end portion of the nozzle 24. Thereby, the backwashing water bypasses the screen 20 and is delivered from the manifold to the nozzle 24.

Inasmuch as it is desirable to have a jet stream opening from the nozzle 24 during backwashing, but during inflow of water into the manifold 21, the nozzle opening must be blocked against ingress of mineral from the bed 7, the nozzle is constructed and arranged to provide a one-way check valve which opens responsive to internal pressure but closes in the absence of such pressure, in reverse relation to the sleeve check valve 27 which responds to external pressure working inwardly but closes in the absence of such external pressure. In a convenient construction, the nozzle 24 is constructed of a resiliently flexible, self-sustaining material on the order of rubber in a pinch-off normally collapsible tube. In response to internal pressure of the backwashing water, the nozzle 24 opens, as shown in full outline in FIGURE 2, and in the absence of the internal water pressure, the nozzle automatically collapses into closed condition as shown in dash outline in FIGURE 2 and in full outline in FIGURE 1. Any external pressure, of course, more thoroughly pinches the valve closed. Through this arrangement, automatic valve control is afforded in respect to the distributor screen 20 and the backwashing nozzle in the several cycles through which the apparatus is operative.

In the modification of FIGURE 3, the invention is embodied in a water-softener apparatus substantially the same as described in respect to FIGURE 1 and including a tank 5' having therein a mineral bed 7', with a manifold pipe 21' extending downwardly within the tank and through the mineral bed 7', with a distributor screen 20' at the lower end of the manifold. Within this screen is mounted a sleeve check valve similar to and functioning the same as the sleeve valve 27. However, in this form of the invention, a scrubbing tube 22', conveniently mounted along side and parallel to the manifold 21', has the backwash water introduced into its upper end rather than into its lower end. For this purpose, the ejector nozzle 24' is carried by the angular nozzle tube 30' communicating with the interior of the manifold 21' and directing the nozzle downwardly into the upper open end of the scrubbing tube 22' which has its lower end spaced above the bottom of the tank sufficiently so that circulation of the backwash stream from the scrubbing tube 22' and the mineral entrained in the backwash water is facilitated. Under acceleration of the backwash water in the scrubbing tube 22', mineral is drawn into the scrubbing tube through vertically spaced annular series of suitable apertures 31. This assures that in a backwashing cycle, substantially all of the mineral in the several strata through which the scrubbing tube 22' extends will be circulated and stagnation of mineral in the bed will be avoided. Even though wash-off of the foreign material is by upward percolation of the wash water after it leaves the scrubbing tube 22', upward flotation of the mineral bed is minimized due to downward circulation thereof by reason of the ejection or pumping action of the injector nozzle 24' on the surrounding mineral bed. The scrubbing, cleansing action of the mineral in the tube 22' is the same as effected in the upward flow tube 22.

In FIGURE 4, a tank 32 has a manifold 33 extending into the bottom thereof in an arrangement where the control valving, timing equipment, and the like is all outside of the tank. On its inner end, the manifold 33 has a distributor screen 34 extending upwardly within the bottom portion of a mineral bed 35 within the tank. During service and regeneration cycles, water is drawn off through the screen 34.

During backwashing cycle, water is introduced through the manifold 33 into the mineral bed 35, but similarly as described in respect to the other embodiments of this invention, a check valve blocks exit of the backwash water through the screen and all of the backwash water is directed upwardly through an injector-ejector nozzle 37 affording a jet stream to propel mineral upwardly within a scrubbing stack tube 38 extending upwardly in alignment with the nozzle and suitably supported within the tank as by means of a spider structure 39. It will be understood, of course, that suitable drain outlet means are provided in the upper portion of the tank 32.

Because of the increased efficiency and low incidence of mineral bed expansion during the backwashing cycle, certain advantages inherent in spherical tank structure are practical in a water softener, and like installation, and the tank 32 is indicated as such a spherical tank. Lower tank cost, especially in Fiberglas construction is one of the advantages of the spherical shape.

Although in the several embodiments of the invention specifically illustrated, only a single scrubbing tube has been shown, for larger installations, and for increased efficiency and high speed backwashing, a cluster of scrubbing tubes and associated injector-ejector jet nozzles may be provided.

By use of the scrubbing tube backwashing feature of the present invention, at least one-third of the time usually required by the conventional percolating backwashing system can be saved, together with proportionate saving in backwashing water expenditure. Caking and channeling of the mineral bed is prevented due to the complete circulation of the mineral bed effected by the improved backwashing method. There is a great increase in cleansing action due to the scrubbing, agitating treatment of the mineral during the backwashing cycle. In a water softener, a higher mineral concentration for a given size tank can be utilized, especially because of the substantial reduction in mineral bed expansion during the backwashing cycle. Line pressure surges are less apt to raise fine particles of the mineral to the drain orifice in the tank so that there is less likelihood of mineral loss during backwashing.

Other advantages will be apparent from the foregoing description.

It will be understood that modifications and variations may be effected without departing from the scope of the novel concepts of the present invention.

I claim as my invention:

1. In a liquid treatment system including a tank having therein a particulate mineral bed and a reservoir space above the top of the bed with means for introducing liquid to be treated into said reservoir space and means for withdrawing from the lower portion of the bed treated liquid which has filtered down through the bed, and wherein filtrate must periodically be removed from the bed, the improvement comprising:
   a scrubbing tube having a discharge end which opens substantially below the top of said bed; and
   means operative to inject a stream of backwashing liquid into said tube and eject a circulation of mineral particles from said bed into said tube to be scrubbed and discharged from said discharge end with the stream of liquid which then moves on in backwashing relation through the mineral bed from said discharge end into said reservoir space.

2. A liquid treatment system as defined in claim 1, in which said discharge end of the scrubbing tube is located to extend upwardly substantially below the top of the mineral bed.

3. A liquid treatment system as defined in claim 1, in which said discharge end of the scrubbing tube is located to project the stream therefrom downwardly within the mineral bed.

4. A method of treating liquid in a tank having therein a particulate mineral bed and a reservoir space above the top of the bed with means for introducing liquid to be treated into said reservoir space and means for withdrawing from the lower part of the bed treated liquid which has filtered down through the bed, and wherein filtrate must periodically be removed from the bed, the steps comprising:
   injecting a stream of backwashing liquid into a scrubbing tube;
   ejecting mineral particles from the bed into said stream and washing the particles in said stream; and
   discharging the stream from the scrubbing tube into the mineral bed substantially below said top of the mineral bed and thereby returning the cleaned mineral particles to the bed and washing filtrate from the bed into said reservoir space.

5. The method according to claim 4, comprising directing said stream from the scrubbing tube upwardly toward said top of the mineral bed.

6. The method according to claim 4, comprising directing the stream from the scrubbing tube downwardly into the mineral bed.

7. In a liquid treatment system including a tank having therein a particulate mineral bed and a reservoir space above the top of the bed with means for introducing liquid to be treated into said reservoir space and means for withdrawing from the lower portion of the bed treated liquid which has filtered down through the bed, and wherein filtrate must periodically be removed from the bed, the improvement comprising:
   an elongated tube defining a vertical scrubbing stack and having a lower inlet end located within the lower portion of said mineral bed and an upper discharge end spaced substantially below and directed toward the top of the bed; and
   an injector-ejector nozzle aligned with said inlet end and operative to discharge a jet of backwashing water upwardly into the scrubbing stack, there being a space between the nozzle and the discharge end through which mineral particles from the bed are ejected into the stack.

8. In a liquid treatment system including a tank having therein a particulate mineral bed and a reservoir space above the top of the bed with means for introducing liquid to be treated into said reservoir space and means for withdrawing from the lower portion of the bed treated liquid which has filtered down through the bed, and wherein filtrate must periodically be removed from the bed, the improvement comprising:
- a scrubbing tube extending throughout a substantial vertical extent of said bed and having an inlet end adjacent to the top of the bed and a discharge end adjacent to the bottom of the bed and a pattern of mineral particle ingress perforations along its length; and
- means for discharging washing liquid downwardly through said inlet end.

9. In a liquid treatment system including a tank having therein a particulate mineral bed and a reservoir space above the top of the bed with means for introducing liquid to be treated into said reservoir space and means for withdrawing from the lower portion of the bed treated liquid which has filtered down through the bed, and wherein filtrate must periodically be removed from the bed, the improvement comprising:
- a scrubbing tube extending through a substantial vertical extent of the mineral bed and having a downwardly projecting discharge end with a series of mineral particle ingress perforations along its length; and
- means located adjacent to the upper end of the tube for directing a stream of washing liquid downwardly through the tube to discharge from said discharge end.

10. In a liquid treatment system including a tank having therein a particulate mineral bed and a reservoir space above the top of the bed with means for introducing liquid to be treated into said reservoir space and means for withdrawing from the lower portion of the bed treated liquid which has filtered down through the bed, and wherein filtrate must periodically be removed from the bed, the improvement comprising:
- a scrubbing tube in said mineral bed and having a series of mineral ingress perforations along its length; and
- means for injecting a stream of washing water through said tube effective to draw mineral particles from the bed through said apertures into the tube to be washed by said stream.

11. A liquid treatment system including a tank having therein a particulate mineral bed and a reservoir space above the top of the bed with means for introducing liquid to be treated into said reservoir space, and wherein the liquid carries foreign matter which is adapted to be filtered out of the liquid by passage of the liquid downwardly through the bed:
- means providing a manifold having a screen within the lowermost portion of the mineral bed for withdrawing treated water which has filtered down through the bed and serving also as means for supplying liquid for backwashing the bed;
- a scrubbing tube within the bed;
- means communicating with the manifold to direct backwashing liquid from the manifold into said backwashing tube; and
- check valve means operative to close said screen for directing backwashing liquid from the manifold through said communicating means into said tube and opening to permit influx of treated water for withdrawal from the bed.

12. A liquid treatment system as defined in claim 11, in which said screen is tubular in form and said check valve means comprise a tubular resiliently flexible sleeve valve within the screen and pressure sensitive to influx of treated liquid to open and automatically close the screen in the absence of such pressure.

13. In combination in a liquid treatment system including a tank having therein a particulate mineral bed and a reservoir space above the top of the bed with means alternatively operable for introducing liquid to be treated into the reservoir space and for withdrawing liquid from the reservoir space during a backwashing cycle:
- a manifold for withdrawing treated liquid from the bottom of said mineral bed and also operative to introduce backwashing water into the tank;
- a backwashing tube in said mineral bed;
- means for directing backwashing water from the manifold into said backwashing tube;
- check valve means for closing communication between the manifold and the mineral bed during backwashing liquid delivery by the manifold and opening the manifold to the mineral bed for withdrawing treated liquid; and
- check valve means controlling said directing means to open responsive to backwash liquid pressure and to close the directing means during treated liquid withdrawing operation of the manifold.

14. In combination in a liquid treatment system including a tank having therein a particulate mineral bed and a reservoir space above the top of the bed with means alternatively operable for introducing liquid to be treated into the reservoir space and for withdrawing liquid from the reservoir space during a backwashing cycle:
- a manifold communicating with the lower portion of the mineral bed and operative for withdrawing treated liquid from the mineral bed and for introducing backwash liquid into the tank;
- valve means for controlling the manifold;
- a scrubbing tube within the mineral bed; and
- means for directing backwash liquid from the manifold into the scrubbing tube and comprising a pinch valve nozzle which opens automatically responsive to backwash liquid pressure and closes automatically in the absence of such pressure.

15. In combination in a liquid treatment system including a tank having therein a particulate mineral bed and a reservoir space above the top of the bed with means alternatively operable for introducing liquid to be treated into the reservoir space and for withdrawing liquid from the reservoir space during a backwashing cycle:
- a manifold having a tubular screen in the lower portion of the mineral bed and operative to withdraw treated liquid from the mineral bed and to deliver backwash liquid into the tank;
- a resiliently flexible sleeve check valve within said screen responsive to treated liquid pressure to open the screen and operative to close the screen responsive to internal pressure of backwashing liquid;
- a nozzle structure extending from said screen and having a nozzle member in the lower portion of the mineral bed normally closed but adapted to open responsive to backwash water pressure to emit a jet stream; and
- a scrubbing tube aligned with said nozzle and receptive of the jet stream for ejection of mineral from the bed by said jet stream into the tube.

16. A liquid treatment system as defined in claim 15, in which said manifold extends downwardly through the mineral bed and said screen extends downwardly from the lower end of the manifold tube and has an adapter connecting the nozzle to the lower end of the screen, and the scrubbing tube is mounted on, and parallel with, the manifold with the lower end of the scrubbing tube adjacently above the screen.

17. A liquid treatment system as defined in claim 15, wherein said manifold tube enters the bottom portion of the tank and said screen extends upwardly within the lower portion of the mineral bed, said nozzle structure extending upwardly from the upper end of the screen, and means mount the scrubbing tube in the tank with its lower end adjacent to, and aligned with, the nozzle.

References Cited

UNITED STATES PATENTS 2,902,445   9/1959   Matthews _____ 210—35
3,317,044   5/1967   Marks _____ 210—279 X SAMIH N. ZAHARNA, *Primary Examiner.*